United States Patent [19]
Bond

[11] Patent Number: 5,209,115

[45] Date of Patent: May 11, 1993

[54] LIQUID DETECTOR FOR THIN-WALLED TANKS OPERATING IN ZERO GRAVITY

[75] Inventor: Donald L. Bond, Sunnyvale, Calif.

[73] Assignee: Intelsat, Washington, D.C.

[21] Appl. No.: 757,754

[22] Filed: Sep. 11, 1991

[51] Int. Cl.[5] .................... B64D 37/02; G01F 17/00; G01F 23/24

[52] U.S. Cl. .................................... 73/295; 219/438; 392/458; 244/135 R; 340/622

[58] Field of Search ............ 73/295, 304 R; 340/622; 219/438; 392/458

[56] References Cited

U.S. PATENT DOCUMENTS

| | | | |
|---|---|---|---|
| 1,833,112 | 11/1931 | Harrison | 73/295 |
| 3,161,050 | 12/1964 | Exner | 73/295 |
| 3,196,679 | 7/1965 | Howland . | |
| 3,465,315 | 9/1969 | Alexander et al. . | |
| 4,449,403 | 5/1984 | McQueen | 73/295 |
| 4,592,230 | 6/1986 | Waring et al. | 73/295 |
| 4,720,997 | 1/1988 | Doak et al. | 73/295 |
| 4,743,278 | 5/1988 | Yeh | 55/159 |
| 4,898,030 | 2/1990 | Yeh | 73/290 R |
| 4,929,930 | 5/1990 | Rezabek | 73/295 |
| 4,935,602 | 6/1990 | Bravo | 392/458 |
| 5,092,170 | 3/1992 | Honstvet et al. | 73/295 |

OTHER PUBLICATIONS

"Intelsat VII", Ford Aerospace Corp., Proposal #SSD-TP85-001 Technical vol. A–Book A3 pp. 7-33 to 7-36, Feb. 1, 1988.

Primary Examiner—Daniel M. Yasich
Attorney, Agent, or Firm—Sughrue, Mion, Zinn, Macpeak & Seas

[57] ABSTRACT

A liquid detector for thin-walled tanks Operating in a zero gravity environment (e.g., outer space). The liquid detector includes a small heater, such as a 1-watt patch heater, and two thermistors positioned on either side of the heater and diametrically opposed to each other. The heater and two thermistors are located on the outside of a propellant tank of, for example, a satellite. One of the thermistors is positioned directly over a region where a propellant management device retains liquid. The other thermistor is spaced apart from the region, while the heater is proximate to the region. In operation, the heater is activated for a short period of time and the change in temperature at each of the two thermistors is observed. The temperature of a thermistor located over a spot having liquid propellant in contact with the tank wall will increase less than the temperature of the thermistor located at a spot where no liquid propellant is present. Thus, by monitoring the temperatures of the thermistors, it is possible to determine if liquid is present and based on the volumetric capacity of the PMD, how much liquid propellant remains in the tank.

20 Claims, 2 Drawing Sheets

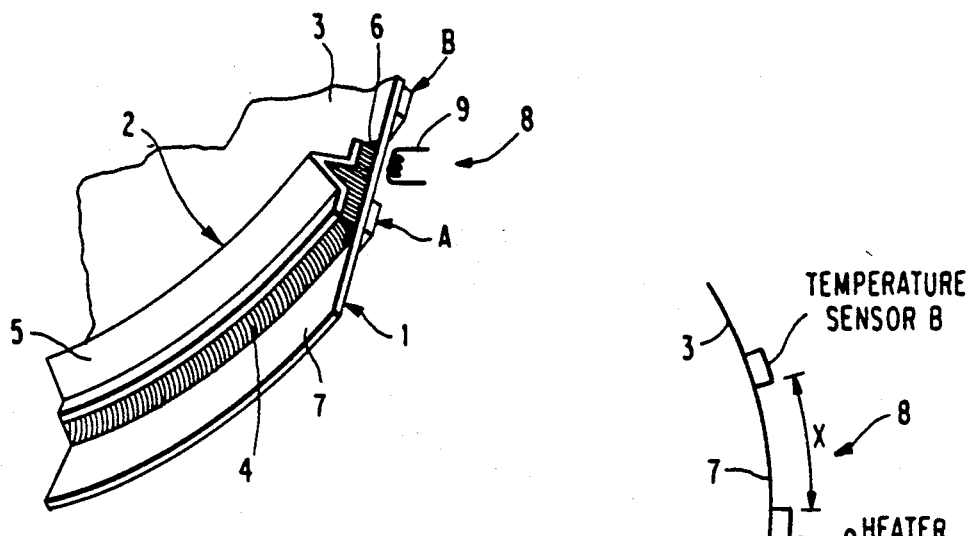
FIG. 1
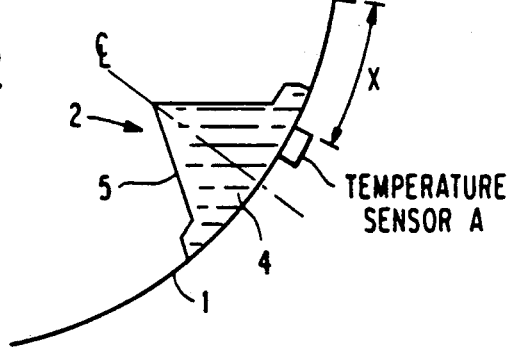
FIG. 2
FIG. 3
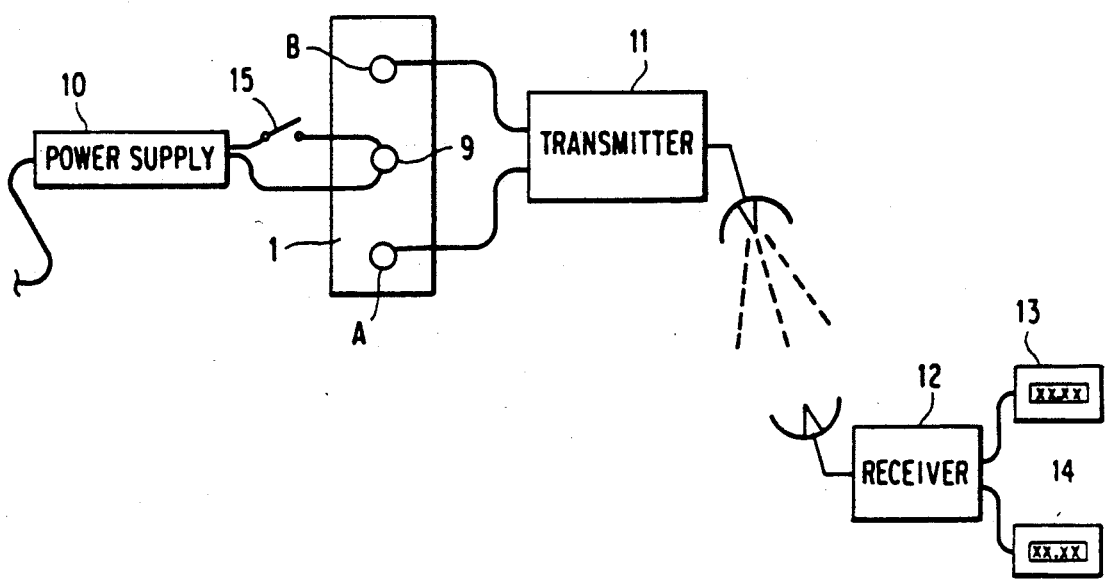

LIQUID DETECTOR FOR THIN-WALLED TANKS OPERATING IN ZERO GRAVITY

BACKGROUND OF THE INVENTION

My invention provides a liquid detector system for use with a tank holding a liquid propellant in a zero gravity environment. In particular, a liquid detector system is provided for determining the quantity of liquid propellant remaining in a spacecraft propellant tank.

In general, it has been difficult to be able to place a replacement satellite into service within a week of the last possible moment without also risking interruption of service due to the end-of-life of the original satellite. In short, it was difficult to predict, with any certainty, how much liquid propellant was remaining in an existing satellite propellant tank in order to send up into outer space the replacement satellite at the last possible moment in order to maximize efficiency.

U.S. Pat. No. 3,161,050 (Exner) discloses a liquid level apparatus for measuring the height of a liquid in a container. The apparatus comprises an elongated heater and a pair of spaced thermocouples which are mounted on a movable member that moves in a track on the outside of the container along the length of the heater. In operation, the heater is continuously energized and the thermocouples respond to the temperature difference in the liquid wall adjacent to the heated zone to indicate the liquid interface.

U.S. Pat. No. 3,465,315 (Alexander et al.) discloses a liquid level indicator device comprising a stainless steel tube provided with a thermocouple secured to a disc and a heater element positioned adjacent to the thermocouple. The liquid level indicator operates by closing a switch to apply power from a battery to the heater element and measuring the temperature through a thermocouple by a liquid level indicator. When the liquid is in contact with the thermocouple/disc, the temperature indication will appear as 4A as seen in FIG. 5 of the '315 patent. When the liquid recedes from the thermocouple, the indicating device will provide a temperature indication 4B as seen in FIG. 5 of the '315 patent.

However, for a zero gravity application, constant heat applied as in Exner and Alexander et al. would yield no evidence of liquid, due to the displacement of the liquid and the creation of a gas barrier at the tank wall thereby making it appear that no liquid is present. Thus, the above-described prior art devices are continuous units and are designed to find a moving interface in the normal 1-g earth atmosphere and will not work in a zero-g environment.

U.S. Pat. Nos. 3,196,679, 4,449,403, and 4,592,230 are of background interest with respect to the present invention.

SUMMARY OF THE INVENTION

My invention provides an apparatus which remedies the problem of being able to determine the quantity of propellant remaining in a spacecraft propellant tank by providing a liquid detector for such thin-walled tanks operating in zero gravity.

In particular, the liquid detector of the present invention includes a heater which is positioned between two temperature sensors located on diametrically opposite sides of the heater. The heater is turned on for a predetermined time by a relay actuated by ground command or the spacecraft computer which is connected to the spacecraft power source, and the change in temperature at each of the two sensors is observed. One of the temperature sensors is selectively located on the outside of the liquid propellant tank such that the sensor is positioned directly over the region where a propellant management device (PMD) will retain liquid propellant. The other temperature sensor is located on the outside of the tank but is spaced apart from the region, while the heater is proximate to the region and is also located on the outside of the tank. A propellant tank with a PMD has specific regions which will retain liquid propellant at the tank wall under zero gravity operation until only a known quantity of liquid propellant remains, and then the remaining liquid propellant is predictably consumed from the known volume at that time.

In operation, the heater is activated for a short period of time and the change in temperature at each of the two sensors is observed. The temperature of the temperature sensor located over a spot having liquid propellant in contact with the tank wall will increase less than the temperature of the sensor located at a spot where no liquid propellant is present. Thus, by monitoring the temperatures of the two sensors, it is possible to determine how much liquid propellant remains in the tank. Knowledge of the remaining liquid will then allow precise prediction of propellant depletion to within a few days.

Alternatively, a detector employing a single temperature sensor and heating means is contemplated. In such a configuration, the temperature sensor which is spaced apart from the specific region is eliminated. Accordingly, when the heating means is activated for the preset period of time, a change in temperature is sensed by the sole temperature sensor and is compared with known rates of temperature change for conditions where liquid propellant is present at the specific region or absent therefrom.

BRIEF DESCRIPTION OF THE DRAWINGS

Other features and advantages of the present invention will be apparent from the following description taken in connection with the accompanying drawings wherein:

FIG. 1 is a fragmentary cutaway view of the propellant management device and the tank wall showing the liquid detector according to my invention;

FIG. 2 is a schematic view showing a portion of the propellant tank wall and also the liquid detector disposed on an outer portion thereof;

FIG. 3 is a simple schematic diagram showing the heater and the two temperature sensors mounted on the outside of the propellant tank, the heater being connected to a power supply by a relay;

DETAILED DESCRIPTION OF THE INVENTION

The invention will now be described with reference to the drawings. As shown in FIG. 1, a fragmentary cutaway of the thin-walled tank is illustrated. The tank 1 serves as a propellant tank for holding liquid propellant, e.g., nitrogen tetroxide ($N_2O_4$), hydrazine ($N_2H_4$) or monomethylhydrazine (MMH), in a spacecraft such as a satellite (e.g., the INTELSAT VII system).

Figure 5:
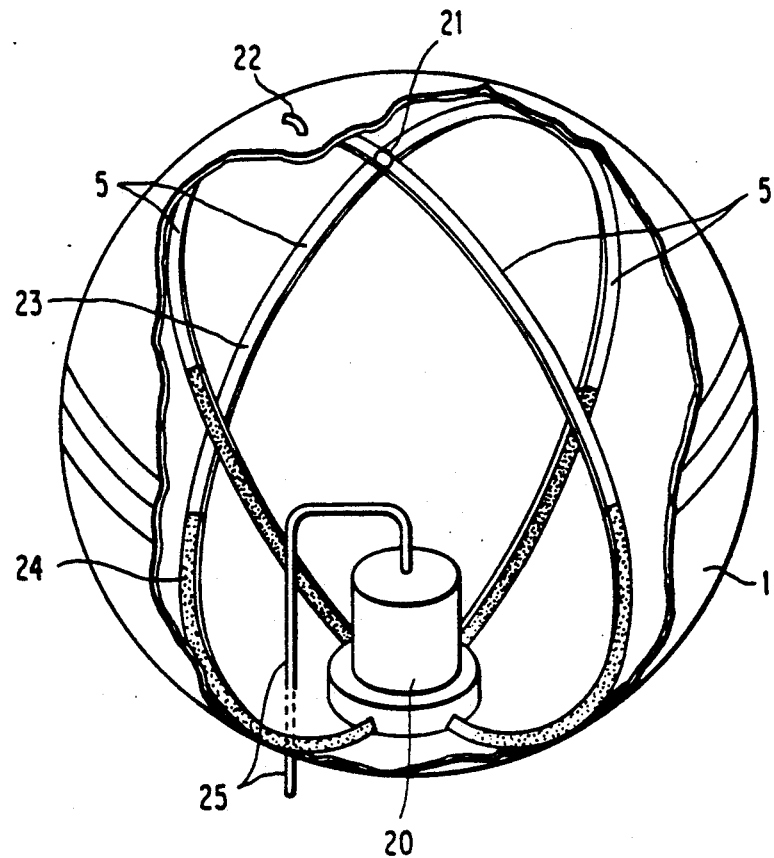
FIG. 5 is an isometric partially broken-away view of a spacecraft liquid propellant tank 1 that can advantageously utilize the present invention.

As shown in FIGS. 1, 2 and 5, a surface tension propellant management device (PMD) 2 is positioned within the tank 1 adjacent to the wall 3. The PMD2 provides a secondary propellant trap with a volume of, for example, 10 liters in the tank 1. This is equivalent to 8.6 kg of fuel and 14 kg of oxidizer, or about 13 months of normal propellant usage in the satellite.

As shown in FIG. 5, the PMD includes four channels 5 (only one of which is shown in FIG. 1) which run from a bottom outlet trap 20 up to a top portion 21. As best seen in FIGS. 1 and 2, each channel 5 has a generally V-shaped cross-section. The channels 5 are arranged in pairs of opposed channels and are each disposed in spaced relation with respect to the inner surface 7 of the spherical tank 1. Tank 1 includes a pressurant inlet 22 and a liquid propellant outlet port 25 as shown in FIG. 5.

Further, each channel 5, disposed within the tank 1, includes an open portion 23 and a screened portion 24 (i.e., the channels are covered by a screen as indicated at the dotted portions). The four channels 5 function to acquire and convey liquid propellant to the outlet trap 20 during zero-g and low-g phases of the spacecraft's mission. Each of the channels 5 of the PMD 2 are positioned such that a known gap 6 is formed between the channels 5 and the inner surface 7 of the wall 3 of the tank 1. The gaps may be maintained by mechanical spacers (not shown) interspersed along each channel 5.

Accordingly, the PMD 2 is configured to selectively position the propellant 4 in the tank 1 in such a manner that, as long as propellant 4 exists outside the channels and traps of the PMD 2, the propellant will locate itself under the channel due to surface tension forces which predominate in a zero gravity environment. Under zero or very low gravity conditions, liquid propellant 4 is retained in the gap 6 as long as there is free liquid propellant remaining in the tank 1. In this instance, free liquid propellant is defined as all propellant in the tank 1 which is not contained in the screened volume of the PMD device including the outlet trap 20 and the screened portions 24 of the channels 5. Note, due to the use of the screened channel portions 24 of the channels 5, the liquid propellant will be preferentially used from the gaps 6 before the liquid propellant within the channels is used to thereby allow for accurate determination of the remaining liquid propellant. A detailed disclosure of the PMD and the tank can be found in U.S. Pat. No. 4,743,278 (Yeh) and also in U.S. Pat. No. 4,898,030 (Yeh), which disclosures are incorporated herein by reference.

Since the location of the propellant 4 as it approaches depletion in the bulk volume of the tank 1 is well known, it then becomes a matter of determining the time when propellant is no longer present at a predetermined point on the inner surface 7 of the tank wall 3 under the PMD 2. At that time, only the liquid propellant 4 within the PMD 2 (e.g., 10 liters) remains in the tank 1. The exact quantity is determined from the actual tank/PMD acceptance test measurements.

In order to detect the presence or absence of liquid propellant within the tank a detecting apparatus generally designated as 8 is employed. As shown in FIGS. 1-3, the detecting apparatus 8 includes a heating means 9 which may take the form of a 1 to 5 watt patch or pad heater which is 1" square, with a 1.5 watt patch heater being preferred. For example, a 1.5 watt heater Space Systems/Loral part no. E001294-02 may be used. The heater 9 may include dual circuits such that each circuit is rated at $\frac{3}{4}$ of a watt for a total output of 1.5 watts. The heater 9 is positioned on the outside of the tank 1 displaced from an edge of the channel 5 of PMD 2 by nominally 1.0 inch. Further, the heater 9 is designed to be connected periodically for a predetermined period of time (e.g., 300 seconds) to a power source 10 on board the spacecraft (see FIG. 3.) via a commandable relay (not shown) or switch 15 as shown in FIG. 3. In particular, the power source is the spacecraft main 42 volt solar array power bus (or 32 volt battery which is operational during an eclipse). The heater is connected or actuated periodically by switch 15 in the spacecraft control electronics by ground command, similar to other spacecraft heater circuits.

The liquid detecting apparatus further includes at least a pair of temperature sensing means A and B which may take the form of thermistors or thermocouples (e.g., chromel-alumel thermocouples). The temperature sensor A is located on the outside of the tank 1 directly over the region where channel 5 of the PMD 2 retains the liquid propellant 4. On the other hand, the temperature sensor B is located away from the channel 5 of the PMD 2. The two temperature sensors A and B are located a distance X of 1 to 2 inches away from the heater 9 on diametrically opposite sides thereof such that the heater 9 is positioned between the two temperature sensors. A distance x=1.5 inches between the heater and each temperature sensor A and B is preferred.

The temperature sensors A and B are connected to a transmitter 11 which is part of the spacecraft's telemeter so as to send standard telemetry signals to a receiver 12 at a ground control station (as is known in the art) where the temperatures may be observed at digital readouts 13 and 14 (see FIG. 3).

According to my invention, the detecting apparatus 8 uses transient heat input into a location wherein liquid propellant may be located and uses the rate of temperature change at a nearby point on the outer surface of the tank wall 3 to discern the presence or absence of liquid propellant locally on the inside. Thus, the invention uses thermal conductance radially in the thin-walled tank 1 (i.e., having a thickness of less than 0.036 in.) from a "point" heat source (i.e., the patch heater 9) together with local conductive heat inward into any liquid held in contact with the tank wall by any mechanism, such as g-loads, or surface tension, or a diaphragm. A determination of the presence of liquid propellant can then be made by comparing the temperature rise as sensed by the two temperature sensors A and B at points radially equidistant from the heat source 9. The temperature sensor B will be in a region that is expected to be dry as the liquid propellant 4 is depleted while the temperature sensor A is positioned over the region where liquid propellant 4 is supposed to be located (i.e., the region under the PMD 2). For example, the temperature sensor A can be positioned midway between a centerline of the channel 5 and a side edge thereof (see FIG. 2).

It is noted that normally when a tank wall is locally heated in zero gravity, the liquid propellant will migrate away from the localized heat point. However due to the design of the PMD 2 the liquid propellant is held at the tank wall 3 between the channel 5 of the PMD 2 and inner surface 7 of the tank wall 3 by surface tension and will not move away when locally heated until the temperature increases to a point where the propellant vapor pressure would exceed the tank pressure. That being the case, the present invention uses the temperature rise on the tank wall 3 near the heater 9 (during the period following periodic actuation of the heater 9) to determine if liquid propellant is still present. The temperature rise, as sensed by the temperature sensors, is markedly different between a dry tank wall 3 and a tank wall 3 with liquid propellant adjacent to it.

In operation, the heater 9 is activated for a short period of time, such as 300 seconds, and then the change in temperature on the tank wall 3 as detected by each of the two temperature A and B is observed. The temperature sensors will respond in one of three ways:

1) Minimal temperature response from either temperature sensor A and B which indicates the presence of liquid propellant next to the tank wall 3 at both temperature sensor locations.

Figure 4:
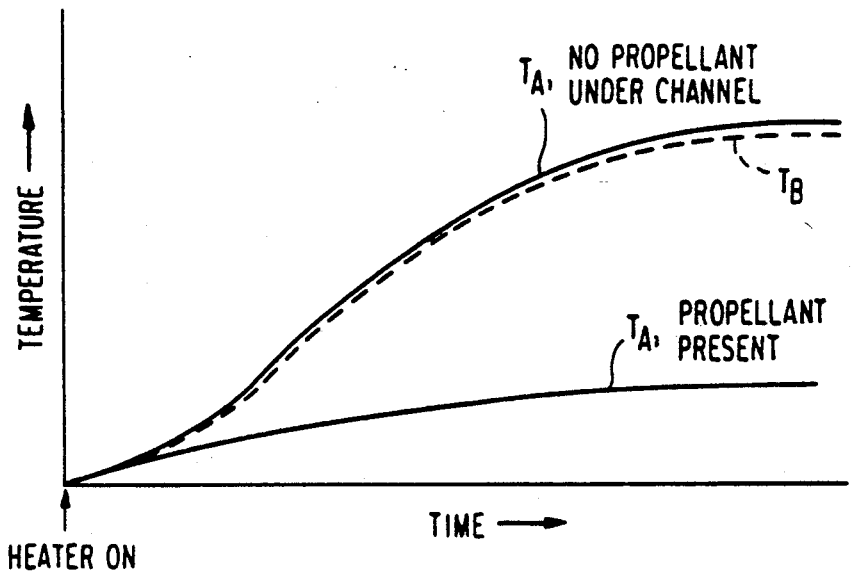
FIG. 4 is a graph showing the typical characteristics of the liquid detector of my invention.

2) Both temperature sensor A and B increase in temperature which indicates the absence of propellant under both temperature sensor locations (see the graph of FIG. 4).

3) The temperature sensor B increases in temperature, while temperature sensor A remains constant or rises only slightly thus indicating that propellant is within the region under channel 5 of the PMD 2 (see the graph of FIG. 4).

Thus, when the temperature sensor B increases in temperature, while the temperature sensor A remains constant or rises only slightly, the liquid propellant 4 is then located within the region of the PMD 2 as shown in FIGS. 1 and 2 (i.e., all the free liquid propellant has been expelled from the tank 1). Further, the liquid propellant 4 is next consumed from the gap 6 between the PMD 2 and the tank wall 3. When liquid propellant 4 is no longer present at the tank wall 3 in the region under the PMD 2 (i.e. the tank wall 3 is dry), the temperature lag between the temperature sensor B and temperature sensor A will disappear and both temperature sensors will increase in temperature since liquid is absent at the tank wall 3 at both temperature sensor locations. Accordingly the quantity of liquid propellant 4 will be known to within the limits of the PMD's remaining trap capacity (e.g., 10 liters).

The heater 9 is turned on, for example, immediately before and/or following North/South (NS) station keeping maneuvers of the existing satellite. Since a single NS maneuver of the satellite will typically use about 0.3 liter or less from the propellant tank, the remaining usable liquid propellant can be determined within that amount, or about one week.

Accordingly, with the present invention, the use of a satellite, such as the INTELSAT VII system, is maximized by being able to place a replacement satellite into service within a week of the last possible moment with minimal risk of an interruption of service.

While the liquid detector apparatus of the present invention is not restricted to use with channel-type PMD's, the liquid detector has its maximum application with such a PMD.

Further, the actual heat input of the heater must be determined uniquely for each application and is a function of the tank wall thickness, material (heat transfer and capacity coefficients), liquid in the tank (heat transfer, vapor pressure and heat capacity) and the geometry of the zero-gravity PMD inside the tank.

While the liquid detector shown in FIG. 2 comprises a pair of temperature sensors A and B and a heater, a detector utilizing a single temperature sensor is likewise contemplated. As shown in FIG. 2, a primary temperature sensor A is located over the selected known liquid retention point or region under the PMD 2 and a 1.5 watt heater is placed 1.5" circumferentially away from the sensor. Further, the second temperature sensor B is positioned 1.5" circumferentially away from the heater 9 and on the opposite side thereof from the first temperature sensor A. The second temperature sensor B is for reference only and is positioned over a region which will normally be dry. The relative temperature rise observed after 5 minutes (or other convenient time periods) from the time that the heater 9 is commanded to be "on" will indicate the presence or absence of liquid at the temperature sensor (refer to FIG. 4). Thus, in an alternative embodiment the temperature sensor B can be eliminated and the system will still operate using ground generated rates of temperature change for wet or dry reference. Typically, if the rise is more than 2° C., then the location is dry, and if the rise is less than 1° C., then the liquid propellant is still present. The relative values will change as a function of the actual heater selected, the specific tank wall thickness and material and the heat capacity of the liquid. The inventive technique will work with any propellant in a tank that has a vapor pressure at the sensed temperature which is less than the pressure in the tank at the time that the sensing is conducted.

It is contemplated that numerous modifications may be made to the liquid detector of my invention without departing from the spirit and scope of the invention as defined in the following claims.

What is claimed is:

1. A liquid detector for detecting a liquid in a thin-walled tank operating in a zero gravity environment, said thin-walled tank including at least one internal zero gravity liquid management device which selectively positions the liquid in said thin-walled tank at a specific region along a wall of said thin-walled tank and under said internal zero gravity liquid management device due to surface tension forces which predominate in said zero gravity environment, said liquid detector comprising:
   a heating means disposed on an outer surface of said thin-walled tank and proximate to said region;
   means for periodically activating said heating means for a preset period of time;
   a first temperature sensing means positioned on the outer surface of said thin-walled tank and directly opposite to said region; and
   a second temperature sensing means positioned on the outer surface of said thin-walled tank and at a location spaced apart from said region;
   whereby when said heating means is activated for said preset period of time, a change in temperature at each of said first and second temperature sensing means is sensed, such that a temperature sensed by one of said first and second temperature sensing means corresponding to a potion of said tank where liquid is in contact with said wall increases less than a temperature sensed by the other of said first and second temperature sensing means located at a portion of said tank where no liquid is present, and a quantity of the liquid remaining in the tank is then known within the limits of a capacity of said internal zero gravity liquid management device.

2. The liquid detector according to claim 1, wherein said heating means comprises a 1-5 watt patch heater.

3. The liquid detector according to claim 1, wherein said preset period of time for activating said heating means is 300 seconds.

4. The liquid detector according to claim 1, wherein said first and second temperature sensing means each comprises a thermistor.

5. The liquid detector according to claim 1, wherein said first and second temperature sensing means each comprises a thermocouple.

6. The liquid detector according to claim 1, wherein said first and second temperature sensing means are located on diametrically opposite sides of said heating means.

7. The liquid detector according to claim 6, wherein each of said first and second temperature sensing means is located at a distance of 1 to 2 inches away from said heating means.

8. The liquid detector according to claim 7, wherein said distance equals 1.5 inches.

9. A liquid detector for detecting a liquid propellant in a thin-walled tank operating in zero gravity, said tank including a propellant management device which selectively positions the liquid propellant in said tank in such a way that, so long as liquid propellant exits outside of said propellant management device, the liquid propellant will locate itself in a region under said propellant management device due to surface tension forces which predominate in zero gravity, said liquid detector comprising:

a heatinq means disposed on an outer surface of said thin-walled tank and proximate to said region;

means for periodically activating said heating means for a preset period of time;

a first temperature sensing means positioned on the outer surface of said thin-walled tank and directly opposite to said region, said first temperature sensing means being located on one side of said heating means; and a second temperature sensing means positioned on the outer surface of said thin-walled tank and at a location spaced apart from said region, said second temperature sensing means being located on a side of said heating means opposite to said first temperature sensing means;

whereby when said heating means is selectively activated for said preset period of time, so long as liquid propellant is present at the wall of said thin-walled tank in said region, a temperature sensed by said first temperature sensing means will rise at a slower rate than that of a temperature sensed by said second temperature sensing means when no liquid propellant is present at the wall of said thin-walled tank proximate to said second temperature sensing means; and when liquid propellant is no longer present at the wall of said thin-walled tank in said region, the temperature sensed by both said first and second temperature sensing means will rise at substantially the same rate, and a quantity of said liquid propellant remaining in said tank is then known within the limits of a capacity of said propellant management device.

10. The liquid detector according to claim 9, wherein said heating means comprises a 1-5 watt patch heater.

11. The liquid detector according to claim 9, wherein said preset period of tie for activating said heating means is 300 seconds.

12. The liquid detector according to claim 9, wherein said first and second temperature sensing means each comprises a thermistor.

13. The liquid detector according to claim 9, wherein said first and second temperature sensing means each comprises a thermocouple.

14. The liquid detector according to claim 9, wherein each of said first and second temperature sensing means is located a distance of 1 to 2 inches away from said heating means.

15. The liquid detector according to claim 14, wherein said distance equals 1.5 inches.

16. A liquid detector for detecting a liquid in a thin-walled tank operating in a zero gravity environment, said thin-walled tank including an internal zero gravity liquid management device which selectively positions the liquid in said thin-walled tank at a specific region along a wall of said thin-walled tank and under said internal zero gravity liquid management device due to surface tension forces which predominate in said zero gravity environment, said liquid detector comprising:

a heating means disposed on an outer surface of said thin-walled tank and proximate to said region;

means for periodically activating said heating means for a preset period of time; and a temperature sensing means positioned on the outer surface of said thin-walled tank and directly opposite to said region;

whereby when said heating means is activated for said preset period of time, a change in temperature at said temperature sensing means is sensed and compared with known rates of temperature change for detecting conditions where liquid is present at said region or is absent from said region, and a quantity of the liquid remaining in the tank is then known within the limits of a capacity of said internal zero gravity liquid management device.

17. The liquid detector according to claim 16, wherein said heating means comprises a 1-5 watt patch heater.

18. The liquid detector according to claim 16, wherein said preset period of time for activating said heating means is 300 seconds.

19. The liquid detector according to claim 16, wherein said temperature sensing means comprises a thermistor.

20. The liquid detector according to claim 16, wherein said temperature sensing means comprises a thermocouple.

* * * * *